Figure 6:
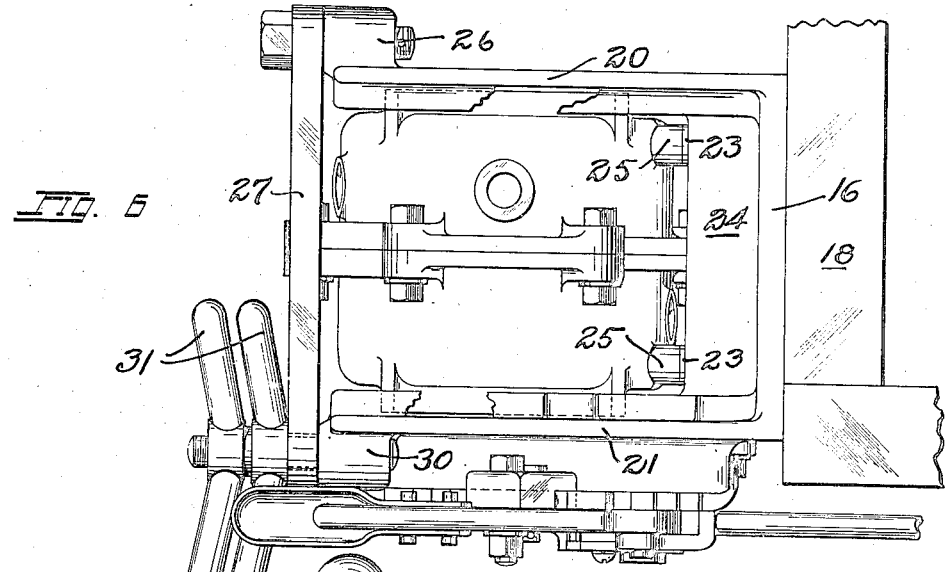

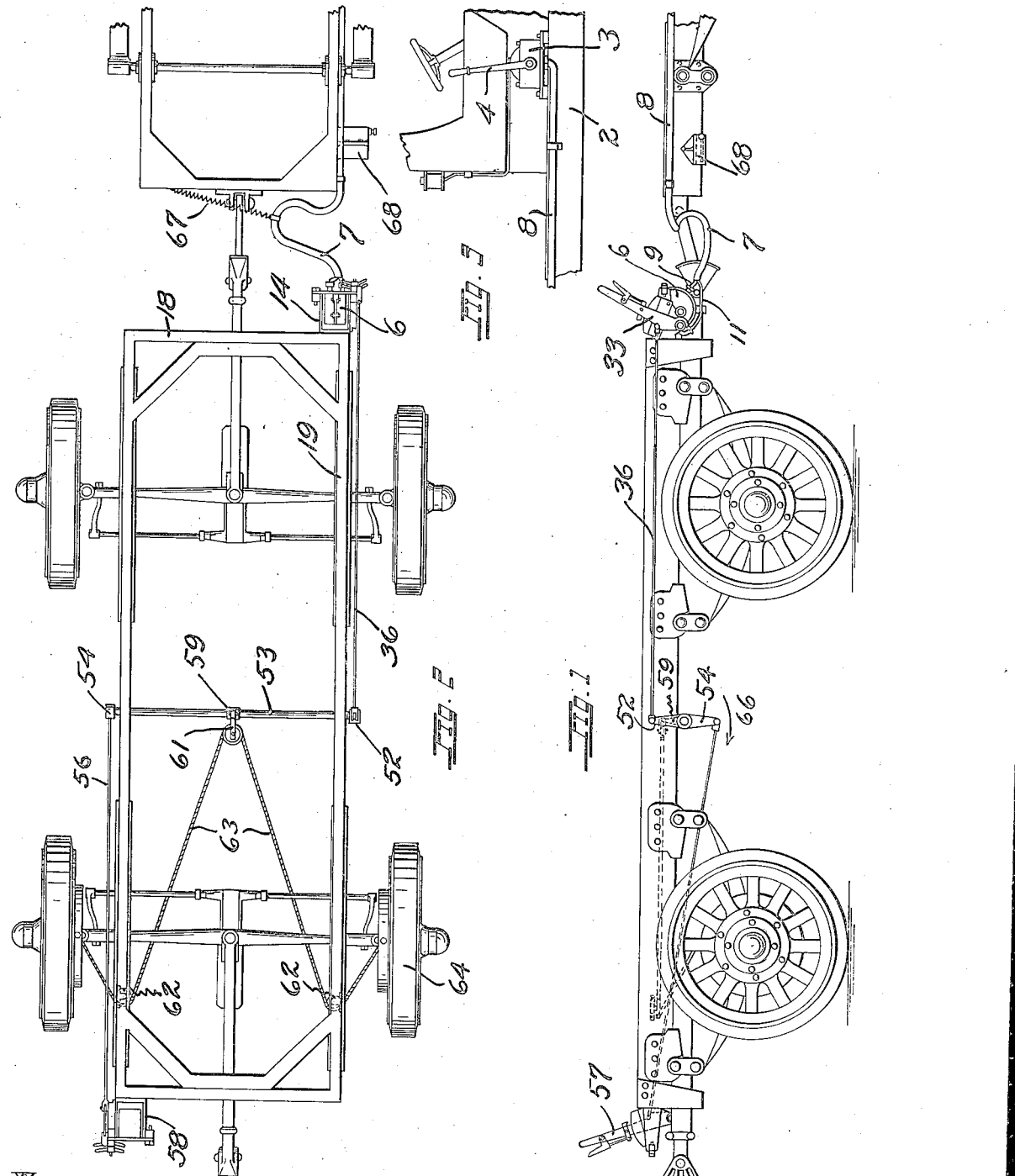

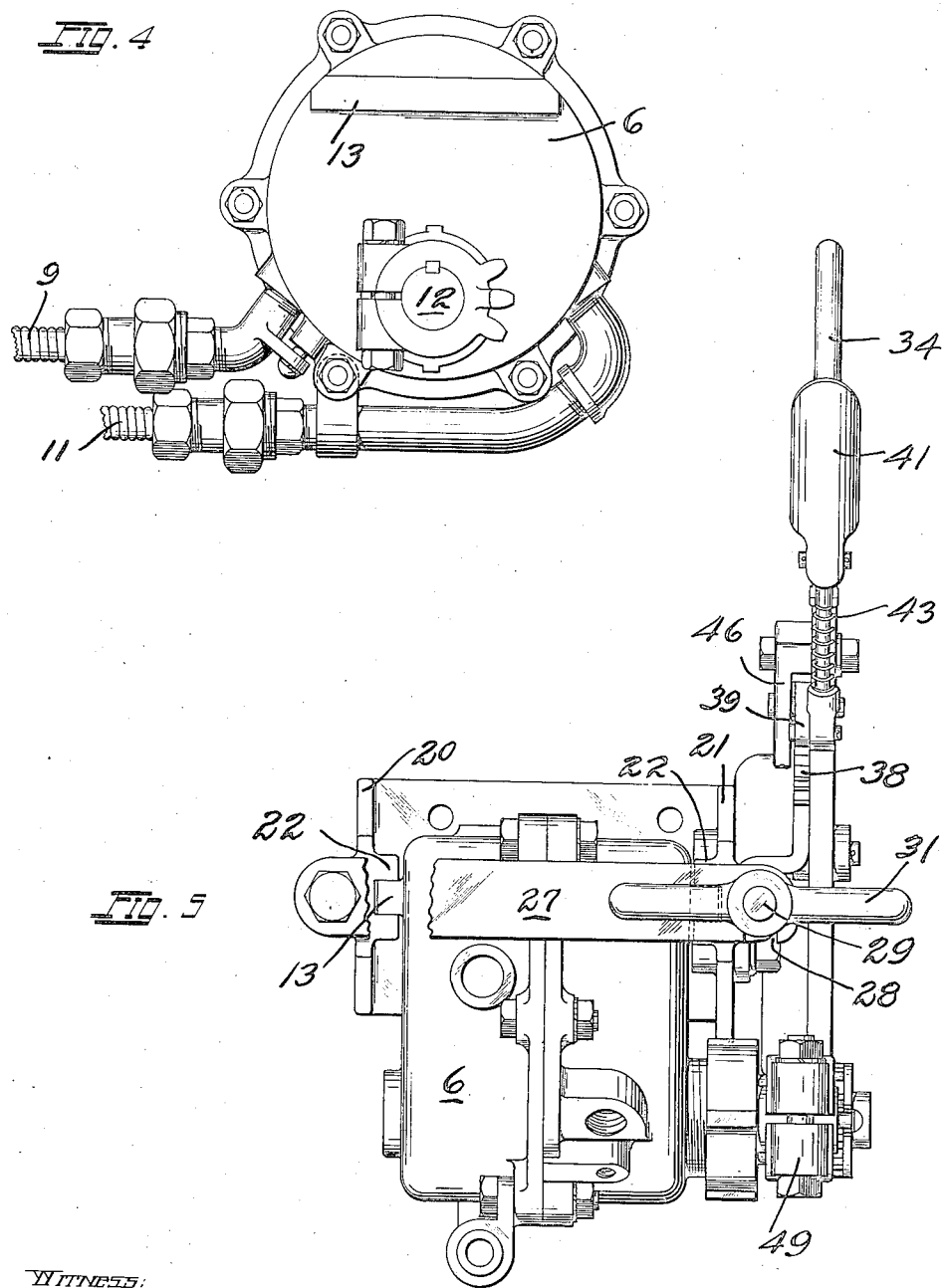

Feb. 6, 1923.

H. L. HIRSCHLER.
BRAKE OPERATING APPARATUS.
FILED FEB. 5, 1920.

1,444,315.

3 SHEETS—SHEET 3.

INVENTOR
HORACE L. HIRSCHLER.

WITNESS:
C. S. Evans his ATTORNEYS

Patented Feb. 6, 1923.

1,444,315

UNITED STATES PATENT OFFICE.

HORACE L. HIRSCHLER, OF SAN FRANCISCO, CALIFORNIA.

BRAKE-OPERATING APPARATUS.

Application filed February 5, 1920. Serial No. 356,393.

*To all whom it may concern:*

Be it known that I, HORACE L. HIRSCHLER, a citizen of the United States, and a resident of the city and county of San Francisco and State of California, have invented a new and useful Brake-Operating Apparatus, of which the following is a specification.

My invention relates to motion transmitting apparatus and particularly to an apparatus comprising a secondary motor actuated by fluid pressure from a primary motor to which it is flexibly connected, the secondary motor being adapted to be releasably coupled to mechanism the operation of which it is desired to control from the primary motor. While in the present application, I shall describe my invention as arranged for the control of the brakes on a trailer from the driver's seat on the truck, it will be apparent that my invention can be used for the control of other devices from a distance, by means of a secondary motor capable of being releasably coupled with the device to be controlled.

The growth of motor transportation and the increasing use of trailers have made it necessary to equip such trailers with brakes and to place within the driver's control means for controlling them. Such brake controlling apparatus must be designed to give instant and effective control despite the varying positions of the two vehicles. It is therefore one of the objects of my invention to provide means for controlling the brakes of a trailer operable from the driver's seat and which is unaffected by movement of the trailer relative to the truck.

The invention possesses other features of advantage, some of which, with the foregoing, will be set forth in the following description of the preferred form of my invention which is illustrated in the drawings accompanying and forming part of the specification. It is to be understood that I do not limit myself to the showing made by the said drawings and description, as I may adopt variations of the preferred form within the scope of my invention as set forth in the claims.

Figure 7:
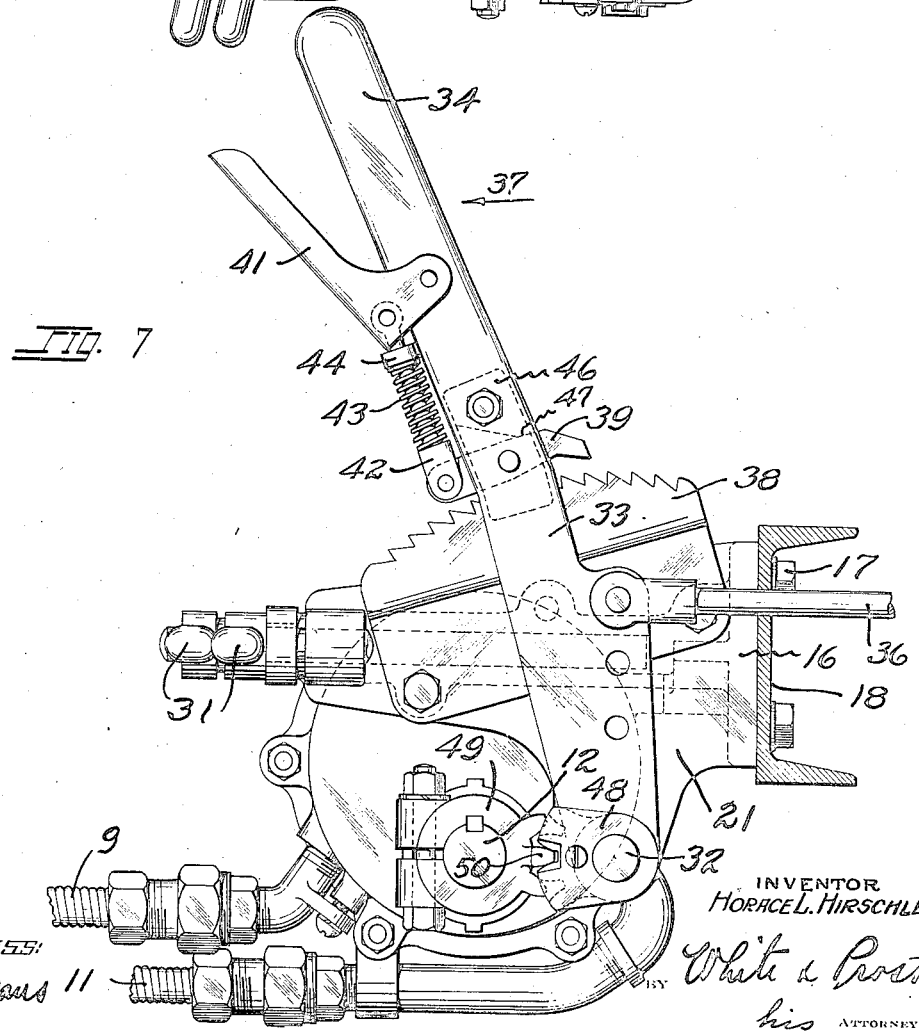

Referring to the drawings:

Figure 1 is an elevation, and Figure 2 a plan view of a truck and the rear end of a trailer showing the application of my brake controlling apparatus. Figure 3 is an extension of Figure 1 showing the primary motor. Figure 4 is a side elevation of the motor for applying power to the trailer brakes. Figure 5 is an end elevation of the motor and socket in which it lies when operative. Figures 6 and 7 are top and right side views of the mechanism shown in Figure 4.

In general terms, my invention comprises a motion transmitting device or primary motor arranged on the truck with control lever convenient to the hand of the driver, a secondary motor adapted to be operated by fluid under pressure from the primary motor and arranged on the end of a flexible conductor at the rear end of the truck, and means on the trailer for actuating the brakes with which the secondary motor is releasably coupled. Thus in order to connect the trailer brakes with the primary motor it is only necessary to seat the secondary motor in a socket suitably disposed on the trailer; the connection being established by the automatic interlocking of parts. Unseating the secondary motor from its socket ipso facto breaks the connection. The required flexibility between the two vehicles is maintained by the flexible conduit. While any of the known motion transmitting devices and motors may be used in connection with my apparatus, I prefer those illustrated and described in Letters Patent of the United States, No. 976,907 of Nov. 29, 1910.

Mounted on the truck frame 2 is a motion transmitting device or primary motor 3 of known form and preferably that referred to above. An operating lever 4 for such device is arranged convenient to the hand of the driver.

A secondary motor 6 of known type adapted to be actuated by liquid under pressure from the primary motor 3 is arranged at the end of the flexible conduit 7 attached to rigid pipe 8 fixed on the truck frame. Flexible liquid conductors 9 and 11 lying in the conduit 7 and pipe 8, connect the primary and secondary motors, so that when the operating lever 4 is moved, the shaft 12 on the secondary motor is turned. The casing of the secondary motor is provided on each side with horizontal slides 13 adapted to engage in grooves formed in the socket generally designated by the character 14. The socket comprises a base plate 16 adapted to be secured by bolts 17 to the end member 18 of the trailer frame 19. Two parallel vertical walls 20 and 21 extend outwardly from the base plate and are provided with spaced ridges 22 forming a groove on each side in which the slides 13 are adapted to lie. Bosses 23 on the web 24 provide stops against which bosses 25 on the motor frame impinge to fix the position of the motor in the socket.

Means are provided for preventing the accidental withdrawal or unseating of the secondary motor from its socket. Pivoted to a lug 26 on the side wall 20 of the socket is a retaining bar 27 formed at the other end with a recess 28 adapting the end of the bar to be engaged over a pin 29 fixed in a lug 30 on the wall 21 of the socket. Two hand nuts 31 are threaded on the pin to lock the bar thereon. By loosening the hand nuts, the bar may be swung upwardly out of the way to permit the withdrawal or unseating of the secondary motor from its socket. With the bar in place, the motor is securely held in the socket against the stops 23.

Pivoted on the pin 32 fixed on the wall 21 which is part of socket 14 is a lever 33 terminating in a handle 34. The lever is connected, by rod 36 pivoted thereto, with the brake mechanism of the trailer, so that movement of the lever in the direction of the arrow 37 sets the brakes. Fixed on the wall 21 is a toothed segment 38 adapted to be engaged by the latch 39 pivoted on the brake lever, so that the lever may be held by the latch in any portion to which it is pushed to set the brakes. The latch does not operate automatically when the brake is operated by the driver of the truck, but only when the trailer is detached from the truck and the brakes are set by hand. The handle 34 is provided with the grip 41 attached to the latch by the link 42. A spring 43 interposed between the link and a lug 44 on the lever normally resiliently retains the latch above the teeth of the segment, but on grasping the handle and grip to set the brakes the latch is engaged with the teeth, the tension on the rod 36 with the brakes set, then being sufficient to keep the latch engaged. The brake lever 33 thus provides means for independent operation of the brakes when the trailer is detached.

It will be observed that the tendency of the spring 43 is to free the latch. Obviously, then, if the brakes are set by hand and the latch engaged to hold the lever in position, any movement of the lever by the secondary motor will release the latch, the brakes then being capable of control by the secondary motor. This feature is valuable in enabling the driver from his seat to release the brakes previously set by hand, by a slight movement of the secondary motor.

A plate 46 bolted to the inside face of the lever 33 provides an additional bearing for the latch pivot pin and also a stop 47 against which the latch is held by the spring in the unengaged position. The plate extends downwardly past the edge of the toothed segment 38 and thus acts as a guard preventing lateral displacement of the lever.

Means are provided for connecting the shaft 12 of the secondary motor, with the lever 33 when the secondary motor is thrust into its socket so that the lever is moved to actuate the brakes by operation of the primary motor. Mounted on the pin 32 and fixed to the lever 33 is a gear segment 48. Fixed on the shaft 12 of the secondary motor is a gear segment 49. The two segments are so disposed that when the secondary motor is thrust into its socket, their teeth are meshed or interlocked in which relation the parts are held by the bar 27. That is to say, when the secondary motor is thrust into its socket the segments automatically interlock and form an operative connection, and this connection is broken only by the withdrawal of the secondary motor which under service conditions is prevented by the bar 27.

In order to prevent engagement of the wrong teeth when the secondary motor is pushed into the socket, which would prevent the proper relation of parts in the apparatus as a whole, one of the teeth 50 on the segment 49 is formed wider than the others. The teeeth on the segment 48 are shrouded, but for the space in which the wide tooth 50 should engage the shroud is omitted. Thus the segments can only mesh in the one position which is arranged to give the proper relation of parts, and to effect such meshing, it may be necessary to move the lever 33 a small amount to bring the teeth into alinement.

The rod 36 connected at one end to the lever 33 extends along one side of the frame 19 of the trailer and is connected to the lever arm 52 fixed on the end of a rock shaft 53. The opposite end of the shaft is provided with another lever arm 54 extending in a direction opposite to that of the arm 52, and this arm is connected by rod 56 with the lever 57 pivoted on the wall of the socket 58. Sockets 14 and 58 are exactly alike and are situated at opposite corners of the frame so that the secondary motor arranged at one corner of the truck can be coupled into either end of the trailer. Irrespective of which socket the secondary motor is in, movement of the shaft 12 is transmitted through the described mechanism and effects a rocking of the shaft 53.

Fixed on the shaft is a lever arm 59 to which is pivotally connected a single sheave block 61. Pivotally arranged on the frame adjacent each wheel at one end of the truck is a pulley 62. A flexible cable 63 is passed about the pulleys as shown in Figure 2 and its ends connected to the levers which operate the brake shoes in a known manner, within the brake drums of the wheels 64. Movement of the shaft 53 in the direction of the arrow 66, Figure 1, places the cable 63 in tension and sets the brakes. Movement of the shaft in the opposite direction permits the releasing springs of the brake shoes to function.

Preferably a coil spring 67 connects the flexible conduit 7 with the frame of the truck so that free swinging of the loop of the conduit is avoided. A bracket 68 is provided on the end of the truck frame in which the secondary motor may lie when no trailer is attached.

I claim:

1. The combination of a primary fluid pressure motor, a secondary fluid pressure motor actuated by and in time with said primary motor, a device to be moved, and means for releasably holding said secondary motor in operative engagement with said device.

2. The combination of a primary fluid pressure motor, a secondary fluid pressure motor actuated by said primary motor and flexibly connected therewith, a device to be moved, and means for releasably holding said secondary motor in operative engagement with said device.

3. The combination of a primary fluid pressure motor, a secondary fluid pressure motor actuated by and in time with said primary motor, mechanism to be operated, means for operating said mechanism, and means for releasably coupling said secondary motor to said mechanism operating means.

4. The combination of a primary fluid pressure motor, a secondary fluid pressure motor actuated by said primary motor, mechanism to be operated, means for manually operating said mechanism, and means for releasably coupling said secondary motor to said manually operating means.

5. The combination of a primary fluid pressure motor, a secondary fluid pressure motor actuated by said primary motor, a flexible conduit connecting said motors, mechanism to be operated, means for operating said mechanism, and means for releasably coupling said secondary motor to said mechanism operating means.

6. The combination of a manually operated primary fluid pressure motor, a secondary fluid pressure motor actuated by and in time with and flexibly connected to said primary motor, mechanism to be operated, a lever for manually operating said mechanism and means for releasably connecting said secondary motor to said lever whereby said mechanism is operated by movement of said primary motor.

7. A truck trailer brake controlling apparatus comprising a primary motor on the truck, a secondary motor actuated by the primary motor, a flexible conduit connecting said motors, brake operating means on the trailer, and means for releasably coupling the secondary motor to said brake operating means.

8. A truck trailer controlling apparatus comprising a primary motor on the truck, a secondary motor actuated by the primary motor and flexibly connected thereto, brake operating means on the trailer, and means for releasably coupling said secondary motor to said brake operating means.

9. A truck trailer controlling apparatus comprising a primary motor on the truck, a secondary motor actuated by the primary motor and flexibly connected thereto, brake operating means on the trailer, a lever for manually actuating said operating means, and means for releasably coupling said secondary motor to said lever.

10. The combination of a primary fluid pressure motor, a secondary fluid pressure motor including a shaft and actuated by said primary motor, a device to be moved, means including a shaft for moving said device, and means for releasably engaging said shafts whereby said secondary motor shaft actuates said device moving means shaft.

11. The combination of a primary motor, a secondary motor actuated by and flexibly connected to said primary motor, a device to be operated, a socket associated with said device and in which said secondary motor may be releasably seated, and means on said socket operatively engaged by said secondary motor when said motor is seated therein for actuating said device.

12. The combination of a primary motor, a secondary motor actuated by and flexibly connected to said primary motor, a device to be operated, a socket associated with said device and in which said secondary motor may be releasably seated, a lever pivotally mounted on said socket, means operatively connecting said lever with said device, and means for operatively connecting said lever to said secondary motor when the latter is seated in said socket.

13. The combination of a primary motor, a secondary motor actuated by and flexibly connected to said primary motor, a device to be operated, a socket associated with said device and in which said secondary motor may be releasably seated, a manually operated lever pivotally mounted on said socket, means operatively connecting said lever with said device, means for operatively connecting said lever to said secondary motor when the latter is seated in said socket, and a latch for holding said lever in position.

14. In a device for controlling mechanism on a truck trailer, a primary motor on the truck, a secondary motor actuated by the primary motor and flexibly connected thereto, means on the trailer for operating said mechanism, and means for releasably coupling the secondary motor to said mechanism operating means.

15. In a device for controlling mechanism on a truck trailer, a primary motor on the truck, a secondary motor actuated by the primary motor and flexibly connected thereto, a socket on the trailer in which said secondary motor may be releasably seated, and means on said socket operatively engaged by said secondary motor when seated therein for actuating said mechanism.

16. In a device for controlling mechanism on a truck trailer, a primary motor on the truck, a secondary motor actuated by the primary motor and flexibly connected thereto, a socket on the trailer in which said secondary motor may be releasably seated, a lever for manually operating said mechanism, means operatively connecting said lever to said mechanism, means for operatively connecting said lever to said secondary motor when the latter is seated in said socket, a manually controlled latch for holding said lever in position, and means for locking said secondary motor in said socket.

17. In a device for controlling mechanism on a truck trailer, a socket arranged on the trailer, a lever on said socket, a shaft pivotally mounted on the trailer frame, an arm on said shaft, a link connecting said arm and said lever, means operatively connecting said shaft to said mechanism, a manually actuated primary motor on said truck, and a secondary motor actuated by and flexibly connected to said primary motor and adapted to be seated in said socket to operatively engage said lever.

18. In a device for controlling mechanism on a truck trailer, a socket arranged on the trailer, a lever on said socket, a shaft pivotally mounted on the trailer frame, an arm on said shaft, a link connecting said arm and said lever, means operatively connecting said shaft to said mechanism, a manually actuated primary motor on said truck, a secondary motor actuated by and flexibly connected to said primary motor and adapted to be seated in said socket to operatively engage said lever, and means for locking said secondary motor in said socket.

19. In a device for controlling mechanism on a truck trailer, a socket arranged on the trailer, a lever on said socket, a shaft pivotally mounted on the trailer frame, an arm on said shaft, a link connecting said arm and said lever, means operatively connecting said shaft to said mechanism, a manually actuated primary motor on said truck, a secondary motor actuated by and flexibly connected to said primary motor and adapted to be seated in said socket to operatively engage said lever, and a manually operated latch for holding said lever in position.

20. In a device for controlling mechanism on a truck trailer, a socket arranged on the trailer, a lever pivoted on said socket, a gear fixed for pivotal movement with said lever, means operatively connecting said lever to said mechanism, a manually actuated primary motor on said truck, a secondary motor seatable in said socket and flexibly connected to said primary motor and having a shaft turned by and in time with said primary motor, and a gear on said shaft engageable with said lever gear when said secondary motor is seated in said socket.

21. The combination of a primary motor, a secondary motor actuated by and flexibly connected to said primary motor, a device to be operated, a socket associated with said device and in which said secondary motor may be releasably seated, a manually operated lever pivotally mounted on said socket, means operatively connecting said lever with said device, means for operatively connecting said lever to said secondary motor when the latter is seated in said socket, a latch for holding said lever in position, and a spring under tension when said latch is engaged for disengaging the latch when the pressure thereon is released by movement of the secondary motor.

22. The combination of a primary motor, a secondary motor actuated by and flexibly connected to said primary motor, a device to be operated, a socket associated with said device and in which said secondary motor may be releasably seated, a manually operated lever pivotally mounted on said socket, means operatively connecting said lever with said device, means for operatively connecting said lever to said secondary motor when the latter is seated in said socket, a toothed segment fixed on said socket, a latch pivoted on said lever and engageable with said segment and held in engagement therewith by the tension on the lever, a spring under tension when said latch is engaged for disengaging the latch when the pressure thereon is released by movement of the secondary motor, and manually actuated means for engaging the latch.

23. The combination of a toothed segment, a lever pivoted adjacent said segment, a latch pivoted on said lever to engage said teeth and adapted to be held in engagement therewith by pressure between said segment and said lever, and a spring for freeing said latch when said pressure is released.

24. The combination of a toothed segment, a lever pivoted adjacent said segment, a latch pivoted on said lever to engage said teeth and adapted to be held in engagement therewith by pressure between said segment and said lever, a spring for freeing said latch when said pressure is released, and manually operated means for engaging said latch with said teeth.

25. The combination of a primary fluid pressure motor, a secondary fluid pressure motor actuated by said primary motor, mechanism to be operated, a lever for manually operating said mechanism, means for releasably coupling said secondary motor to said lever whereby said mechanism may be moved by the secondary motor, a latch for retaining said lever in the position to which it is manually moved, and means for freeing said latch when said lever is moved by said secondary motor.

26. The combination of a primary fluid pressure motor, a secondary fluid pressure motor actuated by said primary motor, mechanism to be operated, a lever for manually operating said mechanism, means for releasably coupling said secondary motor to said lever whereby said mechanism may be moved by the secondary motor, a latch for retaining said lever in the position to which it is manually moved, and fixed in operative position by the pressure of said mechanism on said lever, and a spring for freeing said latch when said lever is moved by pressure in the opposite direction.

27. The combination with mechanism to be actuated, of a motor for actuating said mechanism, a socket in which said motor is releasably held coupled to said mechanism and means for releasing the motor from said socket.

In testimony whereof, I have hereunto set my hand at San Francisco, California, this 26 day of January, 1920.

HORACE L. HIRSCHLER.

In presence of—
H. G. PROST.